US011163461B1

(12) United States Patent
Zhang et al.

(10) Patent No.: US 11,163,461 B1
(45) Date of Patent: Nov. 2, 2021

(54) LOCKLESS METHOD FOR WRITING UPDATED VERSIONS OF A CONFIGURATION DATA FILE FOR A DISTRIBUTED FILE SYSTEM USING DIRECTORY RENAMING

(71) Applicant: VMware, Inc., Palo Alto, CA (US)

(72) Inventors: Ye Zhang, Shanghai (CN); Wenguang Wang, Santa Clara, CA (US); Sriram Patil, San Jose, CA (US); Richard P. Spillane, Mountain View, CA (US); Junlong Gao, Santa Clara, CA (US); Wangping He, Shanghai (CN); Zhaohui Guo, Shanghai (CN); Yang Yang, Shanghai (CN)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 16/853,623

(22) Filed: Apr. 20, 2020

(51) Int. Cl.
  *G06F 15/16* (2006.01)
  *G06F 3/06* (2006.01)
  *G06F 8/658* (2018.01)

(52) U.S. Cl.
  CPC .......... *G06F 3/0629* (2013.01); *G06F 3/0607* (2013.01); *G06F 3/067* (2013.01); *G06F 3/0659* (2013.01); *G06F 3/0664* (2013.01); *G06F 8/658* (2018.02)

(58) Field of Classification Search
  CPC ........ F41B 9/0046; F42B 1/024; F42B 1/028; F42B 1/032; F42B 33/062; F42D 5/045; G06F 8/71; G06F 16/188; G06F 2009/45587; G06F 21/53; G06F 8/30; G06F 8/65; G06F 9/44505; G06F 9/45533; G06F 9/45558; G06F 16/196
  See application file for complete search history.

(56) References Cited

U.S. PATENT DOCUMENTS

2015/0012571 A1* 1/2015 Powell .................. G06F 16/188
  707/827

* cited by examiner

*Primary Examiner* — Yong J Choe
(74) *Attorney, Agent, or Firm* — Loza & Loza, LLP

(57) ABSTRACT

System and method for writing updated versions of a configuration data file for a distributed file system in a storage system uses a directory renaming operation to write a new updated version of the configuration data file using the latest version of the configuration data file and a target directory. After the latest version of the configuration data file is modified by a particular host computer in the storage system, the modified configuration data file is written to a temporary file. The directory naming operation is then initiated on the temporary file to change the directory for the temporary file to the target directory. If the directory renaming operation has failed, a retry is performed by the particular host computer to write the new updated version of the configuration data file using a new latest version and a new target directory.

20 Claims, 7 Drawing Sheets

LOCKLESS METHOD FOR WRITING UPDATED VERSIONS OF A CONFIGURATION DATA FILE FOR A DISTRIBUTED FILE SYSTEM USING DIRECTORY RENAMING

BACKGROUND

A distributed storage system allows a cluster of host computers to aggregate local storage devices, which may be located in or attached to each host computer, to create a single shared pool of storage. This pool of storage is accessible by all host computers in the cluster, including any virtualized computing instances running on the host computers, such as virtual machines (VMs).

In some distributed storage systems, a management service is deployed in each host computer, which manages various software components of a distributed file system used in the storage system. These management services running in the different host computers need to coordinate with each other to perform their tasks to support the file system, which may involve using one configuration data file that can be accessed and modified by the management services. Therefore, race conditions may occur due to concurrent access to the same configuration data file by multiple management services.

One method that can be used to address race conditions for the configuration data file is a file lock with heartbeat mechanism, which includes a file lock feature that can restrict access to the configuration data file to one host computer at a time and a heartbeat feature that allows other host computers to preempt the lock if heartbeat from the current owner host computer is not seen for a predefined number of cycles. However, using such a file lock with heartbeat mechanism will introduce unacceptable timeout periods that will create bad user experience and increase the complexity of the distributed storage system.

BRIEF DESCRIPTION OF THE DRAWINGS

Throughout the description, similar reference numbers may be used to identify similar elements.

DETAILED DESCRIPTION

Figure 1:
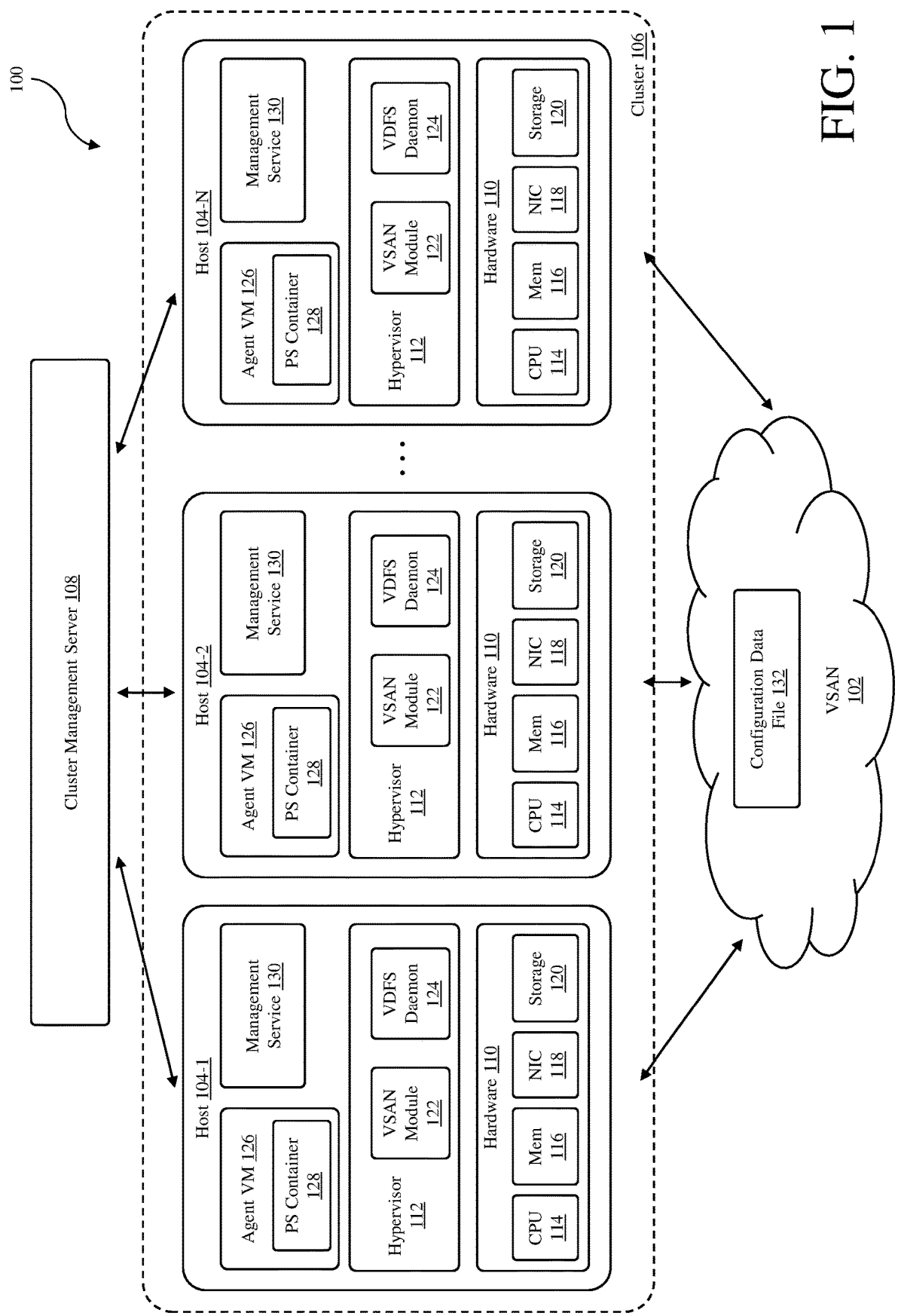
FIG. 1 is a block diagram of a distributed storage system in accordance with an embodiment of the invention.

FIG. 1 illustrates a distributed storage system 100 in accordance with an embodiment of the invention. As shown in FIG. 1, the distributed storage system 100 provides a software-based "virtual storage area network" (VSAN) 102 that leverages local storage resources of host computers 104-1, 104-2 . . . 104-N (where N is a positive integer), which are part of a logically defined cluster 106 of host computers that is managed by a cluster management server 108. The VSAN 102 allows local storage resources of the host computers 104 to be aggregated to form a shared pool of storage resources, which allows the host computers 104, including any software entities running on the host computers, to use the shared storage resources.

The cluster management server 108 operates to manage and monitor the cluster 106 of host computers. The cluster management server may be configured to allow an administrator to create the cluster 106, add host computers to the cluster and remove host computers from the cluster. The cluster management server may also be configured to allow an administrator to change settings or parameters of the host computers in the cluster regarding the VSAN 102, which is formed using the local storage resources of the host computers in the cluster. The cluster management server may further be configured to monitor the current configurations of the host computers and any virtual computing instances (VCIs) running on the host computers. As used herein, a VCI can be any isolated software entity that can run on a computer system, such as a software application, a software process, a virtual machine (VM), e.g., a VMware VM, or a virtual container, e.g., a Docker container. The monitored configurations may include hardware configurations of each of the host computers and software configurations of each of the host computers. The monitored configurations may also include VCI hosting information, i.e., which VCIs (e.g., VMs) are hosted or running on which host computers. The monitored configurations may also include information regarding the VCIs running on the different host computers in the cluster.

The cluster management server 108 may also perform operations to manage the VCIs and the host computers 104 in the cluster 106. As an example, the cluster management server may be configured to perform various resource management operations for the cluster, including VCI placement operations for either initial placement of VCIs and/or load balancing. The process for initial placement of VCIs, such as VMs, may involve selecting suitable host computers for placement of the VCIs based on, for example, memory and CPU requirements of the VCIs, the current memory and CPU load on all the host computers in the cluster and the memory and CPU capacity of all the host computers in the cluster.

In some embodiments, the cluster management server 108 may be a physical computer. In other embodiments, the cluster management server may be implemented as one or more software programs running on one or more physical computers, such as the host computers 104 in the cluster 106, or running on one or more VCIs, which may be hosted on any host computers. In an implementation, the cluster management server is a VMware vCenter™ server with at least some of the features available for such a server.

As illustrated in FIG. 1, each host computer 104 in the cluster 106 includes hardware 110 and a hypervisor 112. The hardware 110 of each host computer includes hardware components commonly found in a physical computer system, such as one or more processors 114, one or more system memories 116, one or more network interfaces 118 and one or more local storage devices 120 (collectively referred to herein as "local storage"). Each processor 114 can be any type of a processor, such as a central processing unit (CPU)

commonly found in a server. In some embodiments, each processor may be a multi-core processor, and thus, includes multiple independent processing units or cores. Each system memory 116, which may be random access memory (RAM), is the volatile memory of the host computer 104. The network interface 118 is an interface that allows the host computer to communicate with a network, such as the Internet. As an example, the network interface may be a network adapter. Each local storage device 120 is a non-volatile storage, which may be, for example, a solid-state drive (SSD) or a magnetic disk.

The hypervisor 112 of each host computer 104, which is a software interface layer that, using virtualization technology, enables sharing of the hardware resources of the host computer by VCIs, such as VMs, running on the host computer. With the support of the hypervisor, the VCIs provide isolated execution spaces for guest software.

In the illustrated embodiment, each hypervisor 112 includes a VSAN module 122 and a virtual distributed file system (VDFS) daemon 124. The VSAN module 122 in each host computer 104 provides access to the local storage resources of that host computer (e.g., handles storage input/output (I/O) operations to data objects stored in the local storage resources as part of the VSAN 102) by other host computers 104 in the cluster 106 or any software entities, such as VMs, running on the host computers in the cluster. As an example, the VSAN module of each host computer allows any VM running on any of the host computers in the cluster to access data stored in the local storage resources of that host computer, which may include virtual disks (or portions thereof) of VMs running on any of the host computers and other related files of those VMs. In addition to these VM I/Os, the VSAN module may handle other types of storage I/Os. The VSAN modules of the host computers in the cluster cooperatively work together to support the VSAN 102.

The VDFS daemon 124 in each host computer 104 operates to support a VDFS for data stored in the VSAN 102. The VDFS daemons of the host computers 104 in the cluster 106 operate together to provide the VDFS, which can be used by each host computer 104 in the cluster 106. In particular, the management of hierarchical namespace metadata of the VDFS is performed by the various VDFS daemons 124. In an embodiment, all metadata operations (e.g., file/directory creation) for a single volume in the VSAN 102 is handled by a single VDFS daemon running on one host computer.

The VDFS supported by the VDFS daemons 124 of the host computers 104 in the cluster 106 is configured or programmed to provide atomic directory renaming operations. As used herein, "atomic" means that when there are multiple directory renaming operations happening concurrently with the same destination name, only one will succeed and the others will get an error code. In an embodiment, the VDFS supported by the VDFS daemons 124 is a distributed Portable Operating System Interface for Computer Environments (POSIX) compatible file system. However, the VDFS supported by the VDFS daemons 124 can be any distributed file system having the feature of providing atomic directory renaming operations.

Each host computer 104 in the cluster 106 further includes an agent VCI 126 with a protocol service (PS) VCI 128 running in the agent VCI. The agent VCI provides the operating environment for the PS VCI to function. The PS VCI provides network file service, such as Network File System (NFS) or Server Message Block (SMB), to clients, which can be any software running on any of the host computers in the cluster or software running in any computer system external to the cluster, such as software running in the cluster management server 108. As illustrated in FIG. 1, in an embodiment, the agent VCI is a VM running in the host computer, which is hosted or managed by the hypervisor of that host computer. In addition, the PS VCI is a container running in the agent VM, which can be moved or migrated among the agent VMs in the cluster to provide rebalance and failover ability.

In order to manage such software stack, there is a management service 130 running on each host computer 104 in the cluster 106. The management services running on the different host computers in the cluster coordinate with each other, which requires exchange of configuration data between the management services. The configuration data includes which host computer needs to manage which protocol service VCIs and shares, which are access points for clients. When there is creation or removal of shares, creation or removal of PS VCIs, or PS VCI failover activity, the configuration data will be changed. Then, each management service can see the change in the configuration data and take appropriate action in response to the configuration change. The configuration data is stored in the VSAN 102 as a configuration data file 132 and managed by the VDFS daemons 124 running on the host computers 104 in the cluster 106.

Since the configuration data is stored in the single configuration data file 132, multiple management services 130 running on different host computers 104 in the cluster 106 may concurrently access the configuration data file to read and modify the file. Thus, the management services 130 are configured or programmed to resolve the concurrent access issue without using any file locking mechanism. In order to make the configuration data file be read and written in an atomic way, the management services 130 leverage atomic directory renaming operations of the VDFS to provide atomic write operations for the configuration data file. As described below, the directory for the configuration data file is used to write new versions or updates of the configuration data file.

When one of the management services 130 in the host computers 104 wants to write a configuration data file, a new directory is created and the content is placed into a file in the new directory. Then, the new directory is renamed to a target name by the management service, which makes the configuration data file in that directory into the current configuration data file. Since directory renaming operations are atomic, if there are multiple management services concurrently performing directory renaming operations, only one of the management services will be successful in renaming the directory, which means that only one of the management services will be successful in creating the configuration data file. It is noted here that read operations are naturally atomic since no management service will directly write to the configuration data file being read.

In order to protect "Read-Modify-Write" sequences, which should theoretically be protected by a file locking mechanism, embodiments of the invention introduce the use of different versions for the configuration data file to take advantage of the atomic directory renaming feature of the VDFS. In each read by one of the management services, the current latest version of the configuration data file is read and remembered, where version is represented as a directory name. Then, any modification to the configuration data file will only happen on the content read with this version. After the modification is complete, the write needs to happen against this current latest version plus a step. For example, if the version for the configuration data file is represented by a numerical value, then the step will be a number, such as one. This is accomplished by the trick of the atomic directory renaming operation, which results in an atomic write. Since directory renaming operations are atomic, if such renaming is failed, it means that some other host computer in the cluster has made a write already. Then, the host computer that failed to complete the write needs to retry again, starting from reading of the current latest version of the configuration data file and redoing the modification and then trying to write again. This process may be repeated more than once until the write is successful.

Figure 2:
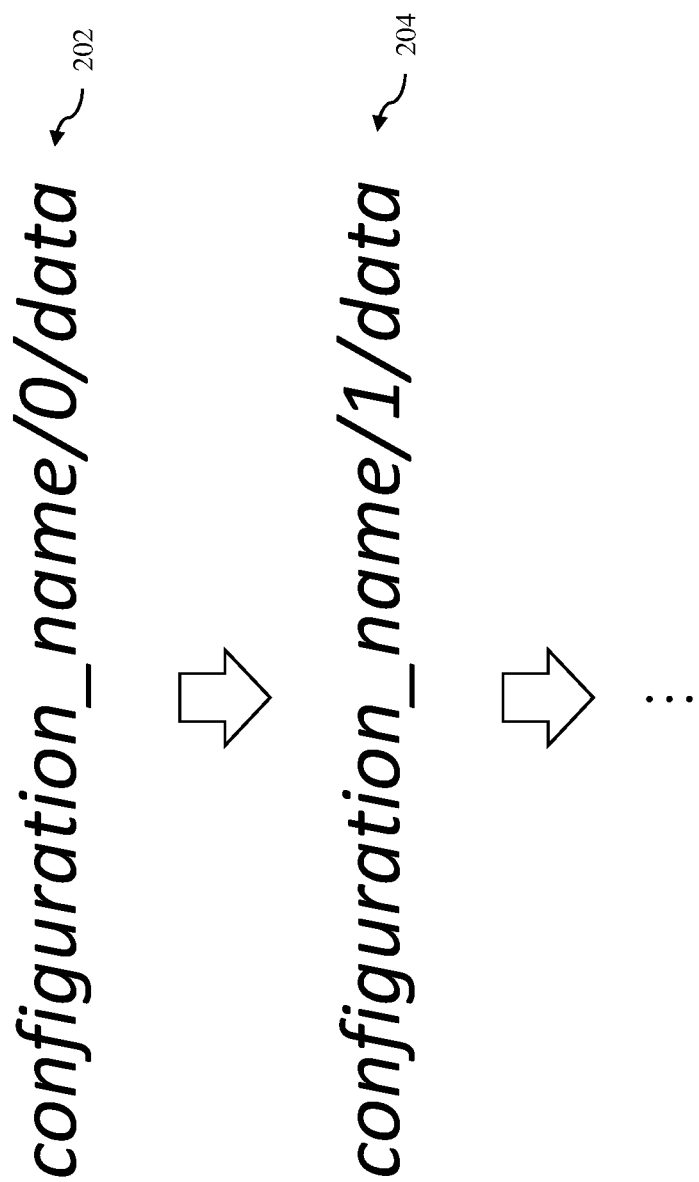
FIG. 2 illustrates an example of file path name evolution of a configuration data file as modifications are made in accordance with an embodiment of the invention.

FIG. 2 illustrates an example of file path name evolution of the configuration data file 132 as modifications are made by the host computers 104 (i.e., the management services 130) in the cluster 106. In this example, the configuration data file is represented as file path: configuration_name/version/data, where configuration_name is the common parent path component name for the configuration data file, as well as the name of the configuration data file, version is the child path component of configuration_name that represents the version of this configuration data file and data is the file that stores concrete configuration data, which are all separated by delimiting characters (forward slashes in this example). The path components configuration_name and version can be viewed as a directory for the configuration data file and data can be viewed as the content of the configuration data file. As shown in FIG. 2, the initial file path 202 for the configuration data file 132 is configuration_name/0/data, which can be written by one of the host computers 104 in the cluster 106 by writing a temporary file, e.g., configuration_name/.hostID/data (where .hostID is the identification of the host computer that has written the temporary file) and then renaming the directory configuration_name/.hostID to a target directory name, which is configuration_name/0.

The configuration data file 132 having the file path 202 can be changed or updated to a new version by one of the host computers 104 in the cluster 106 by reading the current latest configuration data file and modifying the file. The modified file can then be written as a new temporary file, e.g., configuration_name/.hostID/data. The directory configuration_name/.hostID for the temporary file can then be renamed to a target directory that has a version increased by a value of one from the previous version, which in this example would be configuration_name/1 that represents version 1 of the configuration data file. If this renaming operation is successful, then the new file path 204 of this version of the configuration data file will be configuration_name/1/data. If this renaming operation is not successful, the entire process must be repeated using the latest current configuration data file, which would be a newer version of the configuration data file 132.

In this fashion, updated newer versions of the configuration data file 132 are written by the host computers 104 in the cluster 106 without the need for a file locking mechanism to prevent multiple concurrent access or a heartbeat mechanism to detect loss of host aliveness.

Figure 3:
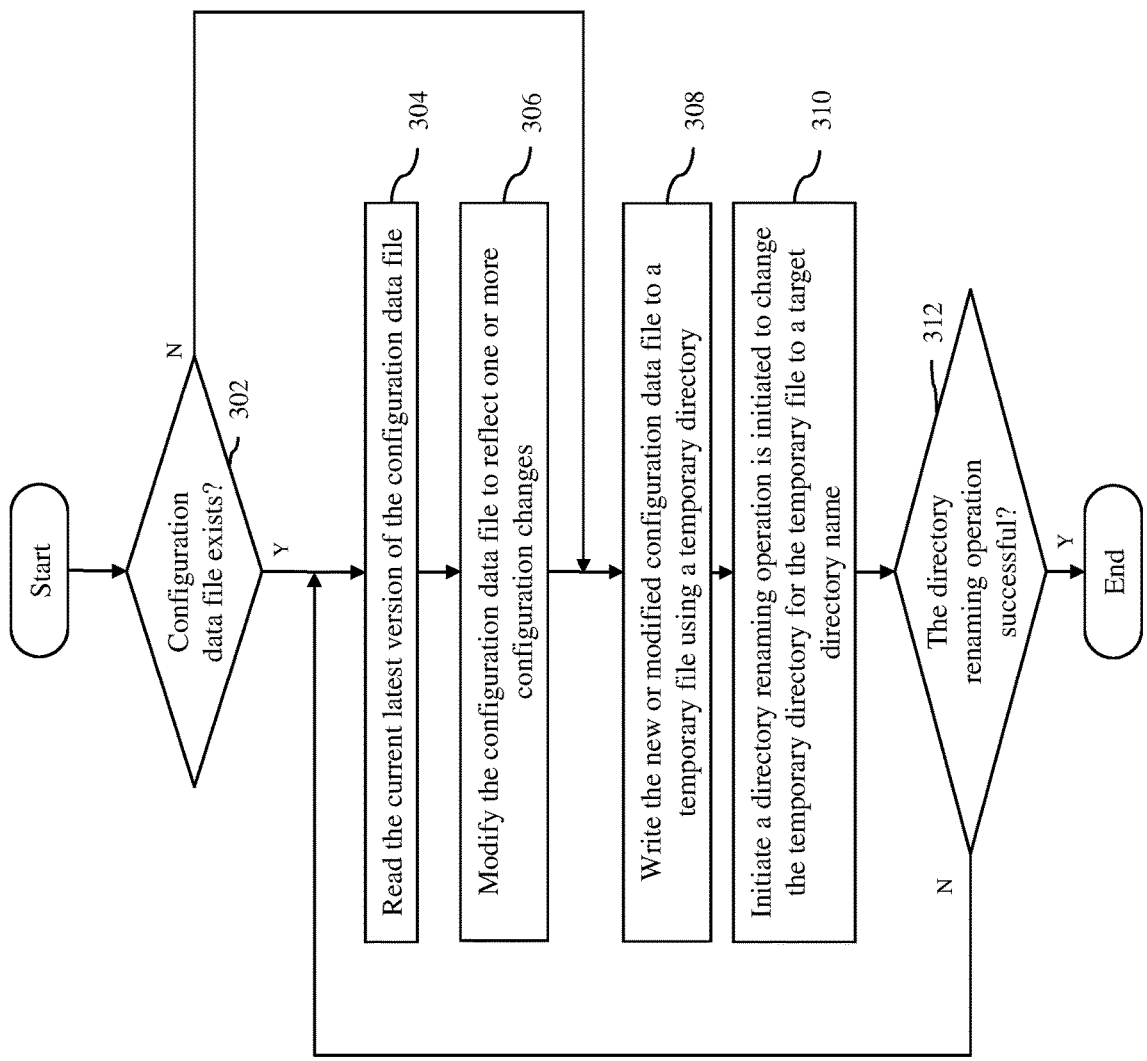
FIG. 3 is a flow diagram of a process to create a new version of the configuration data file in accordance with an embodiment of the invention.

FIG. 3 is a flow diagram of a process to create a new version of a configuration data file by a host computer 104 in the cluster 106 in accordance with an embodiment of the invention. At block 302, a determination is made whether the configuration data file exists. This may be achieved by searching a designated datastore in the VSAN 102. If the configuration data file exists, then the process proceeds to block 304. If configuration data file does not exist, then the process proceeds to block 308.

At block 304, the current latest version of the configuration data file is read by the host computer using the file path for the configuration data file. Next, at block 306, the configuration data file is modified by the host computer to reflect one or more configuration changes.

At block 308, the new or modified configuration data file is written to a temporary file using a temporary directory. Next, at block 310, a directory renaming operation is initiated to change the temporary directory for the temporary file to a target directory name. If there is no existing configuration data file, the target directory name may indicate an initial version, e.g., version 0, for the configuration data file. If there is an existing configuration data file, the target directory name may indicate the next version for the configuration data file, which may be represented by a numerical value that is greater than the previous version value by one.

Next, at block 312, a determination is made whether the directory renaming operation was successful. In an embodiment, one or more of the VDFS daemons 124 that support the VDFS used for the VSAN 102 transmits a message to the host computer that shows whether the directory renaming operation was successful or not. For example, an error message may indicate that the directory renaming operation has failed and a confirmation message may indicate that the directory renaming operation was successful. If the directory renaming operation was successful, the process comes to an end. However, if the directory renaming operation was not successful, the process proceeds back to block 304 to try again using the current latest version of the configuration data file.

Figure 4:
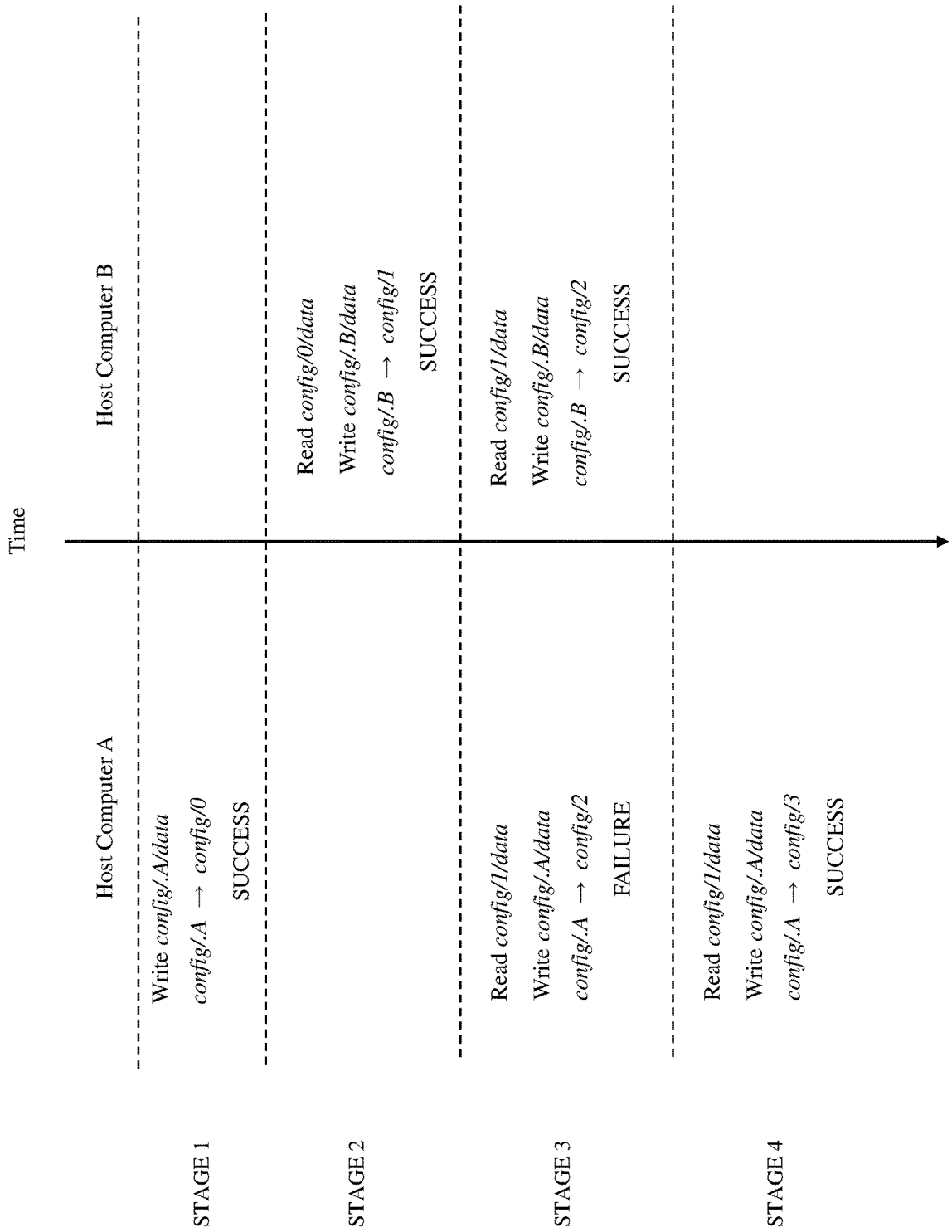
FIG. 4 illustrates the process to create a new version of the configuration data file in different scenarios in accordance with an embodiment of the invention.

This process to create a new version of the configuration data file will be further described using an example that shows the process in different scenarios, which is illustrated in FIG. 4, in accordance with an embodiment of the invention. Initially, the configuration data file does not exist. Thus, one of the host computers 104 in the cluster 106 will create the first version (e.g., version 0) of the configuration data. In this example, a host computer A creates the first version of the configuration data file in stage 1. Stage 1 includes two steps, which are performed by the host computer A. In the first step, the initial configuration is written to a temporary file having the file path config/.A/data. Thus, the directory name for this temporary file is config/.A. In the second step, a directory renaming operation is initiated to change the directory for the temporary file to a target directory, which in this situation is config/0. In this example, no other host computer in the cluster is also trying to rename their temporary file to the same target directory. Thus, the directory renaming operation is successful, which means that the current latest version of the configuration data file will have a file path of config/0/data.

In stage 2, the host computer B wants to modify the configuration data file. Stage 2 includes three steps, which are performed by the host computer B. In the first step, the current latest version of the configuration data file is read by the host computer B, which in this case is the configuration data file having the file path config/0/data. In the second step, the configuration data file is modified and written to a temporary file having the file path config/.B/data. Thus, the directory name for this temporary file is config/.B. In the third step, a directory renaming operation is initiated to change the directory for the temporary file to a target directory, which in this situation is config/1. In this example, no other host computer in the cluster is also trying to rename their temporary file to the same target directory. Thus, the directory renaming operation is successful, which means that the current latest version of the configuration data file will have a file path of config/1/data.

In stage 3, both of the host computers A and B want to modify the configuration data file. Similar to stage 2, stage 3 includes three steps, which are performed by both the host computers A and B. In the first step, the current latest version of the configuration data file is read by the host computers A and B, which in this case is the configuration data file having the file path config/1/data. In the second step, the configuration data file is modified and written to a temporary file by the host computers A and B, For the host computer A, the modified configuration data file is written to a temporary file having the file path config/.A/data. For the host computer B, the modified configuration data file is written to a temporary file having the file path config/.B/data. In the third step, a directory renaming operation is initiated by both of the host computers A and B to change the directory for their respective temporary file to a target directory, which in this situation is config/2. However, since both the host computers A and B have initiated the directory renaming operations, only one of the two directory renaming operations will be successful due to the atomic nature of directory renaming operations for the VDFS in the distributed storage system 100. In this example, the directory renaming operation initiated by the host computer B is successful. Thus, the directory renaming operations initiated by the host computer A has failed. Consequently, the entire process must be subsequently repeated for the host computer A using the current latest version of the configuration data file, which is reflected in stage 4.

In stage 4, the host computer A wants to again modify the configuration data file. Stage 4 includes three steps, which are again performed by the host computer A. In the first step, the current latest version of the configuration data file is read by the host computer A, which in this case is the configuration data file having the file path config/2/data. In the second step, the configuration data file is modified and written to a temporary file having the file path config/.A/data. In the third step, a directory renaming operation is initiated to change the directory for the temporary file to a target directory, which in this situation is config/3. In this example, no other host computer in the cluster is also trying to rename their temporary file to the same target directory. Thus, the directory renaming operation is successful, which means that the current latest version of the configuration data file will have a file path of config/3/data.

In this fashion, concurrent accesses to the configuration data file 132 for modifications by multiple host computers 104 in the cluster 106 are resolved without the need for a locking mechanism. In addition, there is no need to determine whether any of the host computers in the cluster has lost aliveness.

In the above procedure, new or updated versions of the configuration data file will be continuously created. Thus, stale versions of the configuration data file should be removed. In theory, old versions of the configuration data file cannot be deleted if there is a possibility that any of the host computers in the cluster are reading these versions. For example, in the above procedure illustrated in FIG. 4, let's assume that the host computer A reads version 3 of the configuration data file and tries to write to a new version 4 after modification. However, if the modification takes a very long time for some reason, the host computer B may, during this period, possibly bump the version of the configuration data file to some large value, such as 100, which means version 4 of the configuration data file has now been written. Since the host computer A is still with version 3 of the configuration data file and will try to write version 4 of the configuration data file after the modification, the existing version 4 of the configuration data file cannot be deleted since it is needed to make sure the host computer A will get a failure when a directory renaming operation is initiated by the host computer A to try to write a new version 4 of the configuration data file.

To resolve this issue, a limitation can be added to the procedure that any host computer should not hold a version of the configuration data file for a very long time, e.g., 5 minutes. This makes sense, since for a frequently accessed and shared resource, if one host computer holds the resource for a very long time, this is actually a bug that impacts the whole system, which needs to be fixed. So, after every predefined time duration, e.g., every 5 minutes, one host computer can remove the versions of the configuration data file (except for the current latest version) that were created before the predefined time duration. This host computer may be selected using any known mechanism. In a particular implementation, the selected host computer may be the VSAN cluster master node.

Thus, when a host computer realize that it has been holding a version of the configuration data file for more than the predefined time duration, that host computer should retry its procedure to modify the current latest configuration data file even if the initiated write via a directory renaming operation was successful. This is due to the fact that the previous write is not trustable.

Figure 5:
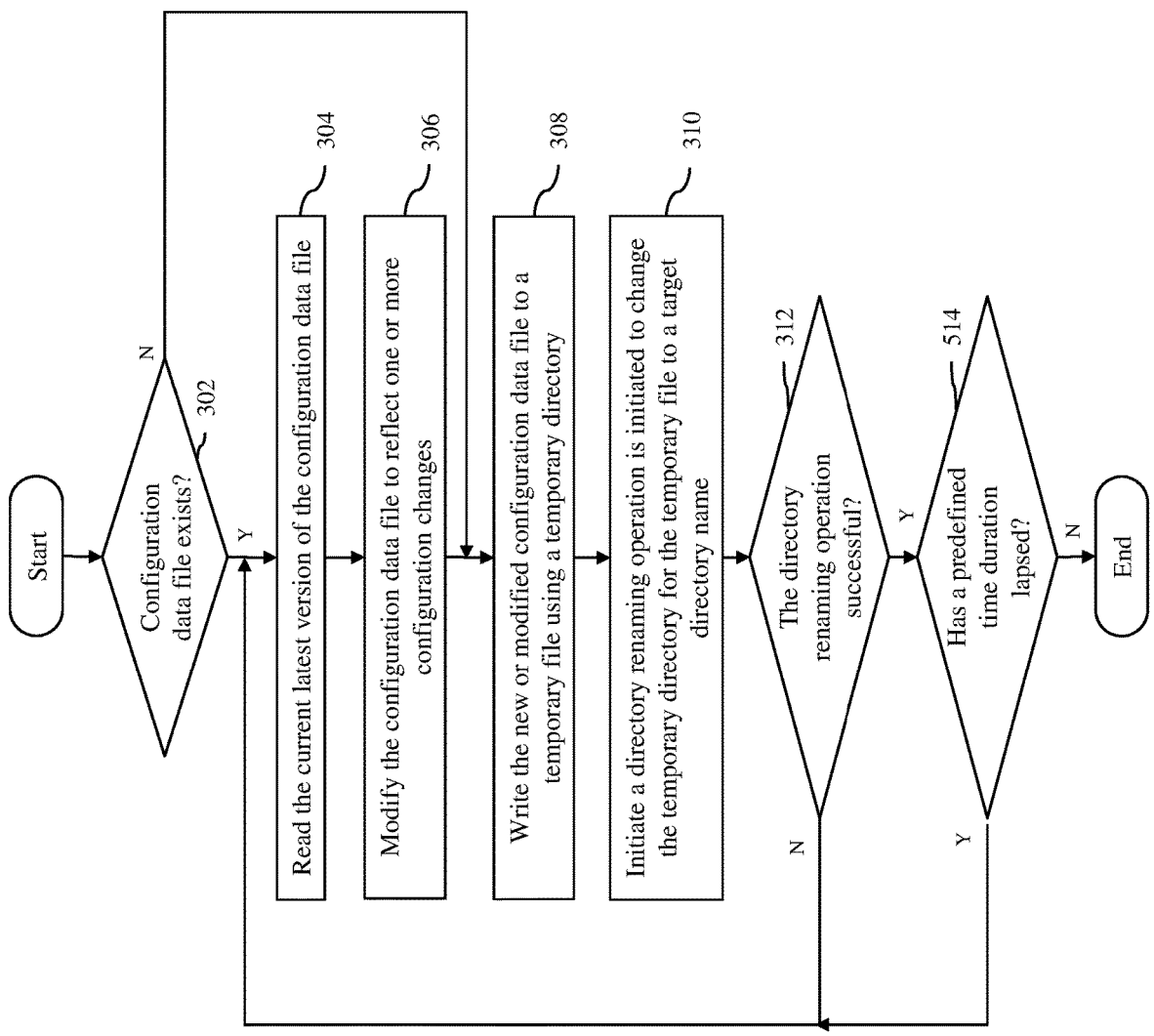
FIG. 5 is a flow diagram of a process to create a new version of the configuration data file with a limited hold time feature in accordance with an embodiment of the invention.

FIG. 5 is a flow diagram of a process to create a new version of the configuration data file by a host computer 104 in the cluster 106 with a limited hold time feature in accordance with an embodiment of the invention. This process is similar to the process illustrated in FIG. 3 up to block 312, where a determination is made whether the directory renaming operation is successful. If the directory renaming operation was successful, the process proceeds to block 514, where a determination is made whether a predefined time duration, e.g., 5 minutes, has lapsed since the configuration data file was accessed to be read. If the predefined time duration has not lapsed, then the process comes to an end since there is no need for retry of the read-modify-write-rename operation. However, if the predefined time duration has lapsed, then the new write cannot be trusted, and a retry of the read-modify-write-rename operation should be performed. Thus, the process proceeds back to block 304 to ensure a proper new version of the configuration data file is created.

Figure 6:
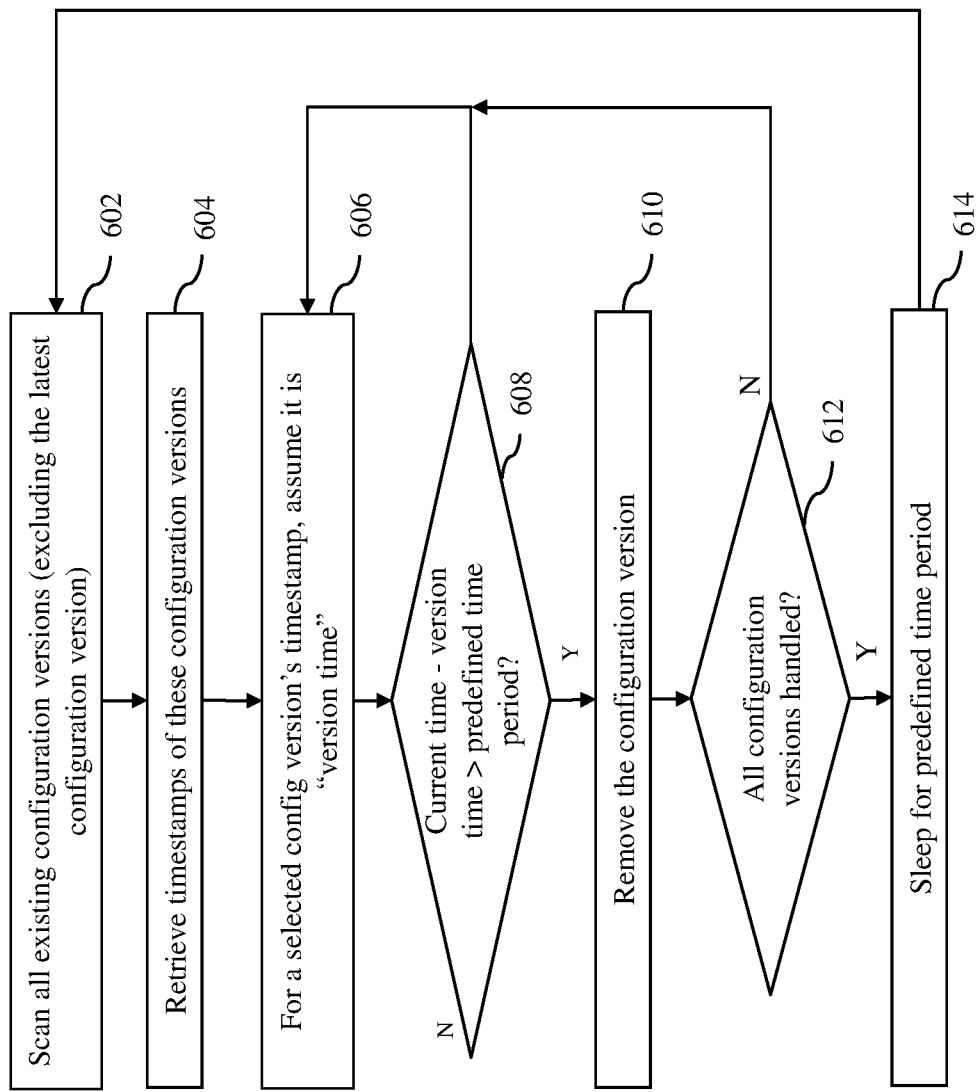
FIG. 6 is a flow diagram of a process to remove stale versions of the configuration data file in accordance with an embodiment of the invention.

FIG. 6 is a flow diagram of a process to remove stale versions of the configuration data file by a master host computer in the cluster 106 in accordance with an embodiment of the invention. The master host computer could be a generic master node in a typical distributed system, or it could be agreed upon by the host computers in the cluster using a certain selection method, such as the host computer with the lowest or highest ID, as long as such selection is definitive. In the following description, versions of the configuration data file will simply be referred to herein as "configuration versions".

At block 602, all existing configuration versions except the latest configuration version are scanned. Next, at block 604, the timestamps of these configuration versions are retrieved. Next, at block 606, for a selected configuration version, assume the timestamp of the configuration version is "version time".

Next, at block 608, a determination is made whether the current time minus the version time is greater than a predefined time period, e.g., 5 minutes. If no, then the process proceeds back to block 606 to examine another configuration version. If yes, then the process proceeds to block 610, where the selected configuration version is removed, i.e., deleted.

Next, at block 612, a determination is made whether all the configuration version have been handled. If no, then the process proceeds back to block 606 to examine another configuration version. If yes, then the master host computer sleeps or waits for a predefined time period, e.g., 5 minutes, with respect to this process before proceeding back to block 602 to delete additional stale configuration versions. This predefined time period may be the same time period used in block 608.

Figure 7:
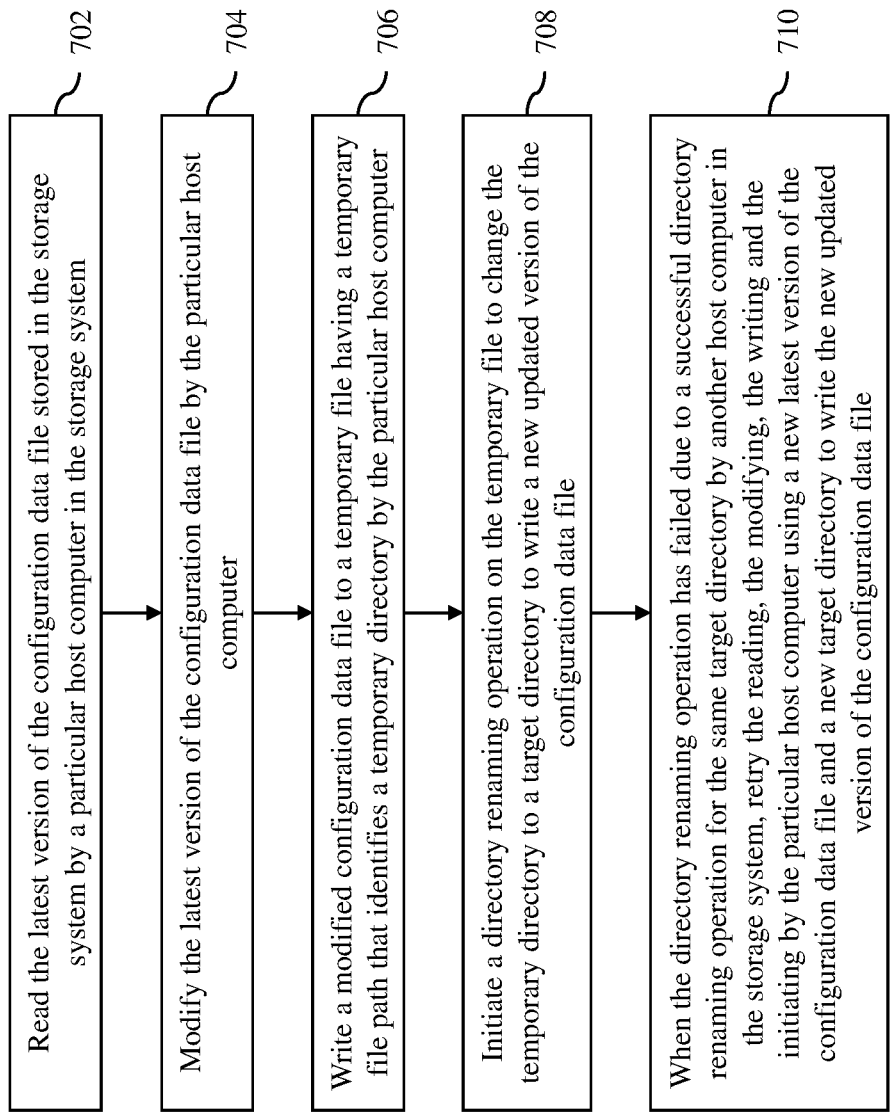
FIG. 7 is a flow diagram of a method for writing updated versions of a configuration data file for a distributed file system in a storage system in accordance with an embodiment of the invention.

A method for writing updated versions of a configuration data file for a distributed file system in a storage system in accordance with an embodiment of the invention is described with reference to a flow diagram of FIG. 7. At block 702, the latest version of the configuration data file stored in the storage system is read by a particular host computer in the storage system. The latest version of the configuration data file is accessible by different host computers in the storage system. At block 704, the latest version of the configuration data file is modified by the particular host computer. At block 706, a modified configuration data file is written to a temporary file having a temporary file path that identifies a temporary directory by the particular host computer. At block 708, a directory renaming operation is initiated on the temporary file to change the temporary directory to a target directory to write a new updated version of the configuration data file. At block 710, when the directory renaming operation has failed due to a successful directory renaming operation for the same target directory by another host computer in the storage system, the reading, the modifying, the writing and the initiating are retried by the particular host computer using a new latest version and a new target directory to write the new updated version of the configuration data file.

The components of the embodiments as generally described in this document and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, non-volatile memory, NVMe device, persistent memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for writing updated versions of a configuration data file for a distributed file system in a storage system, the method comprising:
   reading a latest version of the configuration data file stored in the storage system by a first host computer in the storage system, the latest version of the configuration data file being accessible by different host computers in the storage system;
   modifying the latest version of the configuration data file by the first host computer;
   writing a modified configuration data file to a temporary file having a temporary file path that identifies a temporary directory by the first host computer;
   initiating a directory renaming operation on the temporary file to change the temporary directory to a target directory to write a new updated version of the configuration data file; and
   when the directory renaming operation has failed due to a successful directory renaming operation for the same target directory by another host computer in the storage system, retrying the reading, the modifying, the writing and the initiating by the first host computer using a new latest version of the configuration data file and a new target directory to write the new updated version of the configuration data file.

2. The method of claim 1, wherein the target directory indicates a next version for the configuration data file with respect to the latest version of the configuration data file.

3. The method of claim 2, wherein the target directory includes a common path component used for all versions of the configuration data file and a child path component that indicates the next version for the configuration data file with respect to the latest version of the configuration data file.

4. The method of claim 2, wherein the target directory includes a path component with a numerical value that indicates the next version for the configuration data file with respect to the latest version of the configuration data file.

5. The method of claim 4, wherein the numerical value of the path component in the target directory is a value of the path components in a directory of the latest version of the configuration data file plus one.

6. The method of claim 1, further comprising:
   when the directory renaming operation is successful, checking to see if a predefined time period has passed since the reading of the latest version of the configuration data file and, if the predefined time period has passed, retrying the reading, the modifying, the writing and the initiating using another new latest version of the configuration data file and another new target directory by the first host computer; and
   periodically removing versions of the configuration data file that were created prior to the predefined time period.

7. The method of claim 6, wherein periodically removing versions of the configuration data file is performed by a second host computer in the storage system that is designated as a master node for a virtual storage area network in the storage system.

8. A non-transitory computer-readable storage medium containing program instructions for writing updated versions of a configuration data file for a distributed file system in a storage system, wherein execution of the program instructions by one or more processors of a computer system causes the one or more processors to perform steps comprising:
   reading a latest version of the configuration data file stored in the storage system by a first host computer in the storage system, the latest version of the configuration data file being accessible by different host computers in the storage system;
   modifying the latest version of the configuration data file by the first host computer;
   writing a modified configuration data file to a temporary file having a temporary file path that identifies a temporary directory by the first host computer;
   initiating a directory renaming operation on the temporary file to change the temporary directory to a target directory to write a new updated version of the configuration data file; and
   when the directory renaming operation has failed due to a successful directory renaming operation for the same target directory by another host computer in the storage system, retrying the reading, the modifying, the writing and the initiating by the first host computer using a new latest version of the configuration data file and a new target directory to write the new updated version of the configuration data file.

9. The computer-readable storage medium of claim 8, wherein the target directory indicates a next version for the configuration data file with respect to the latest version of the configuration data file.

10. The computer-readable storage medium of claim 9, wherein the target directory includes a common path component used for all versions of the configuration data file and a child path component that indicates the next version for the configuration data file with respect to the latest version of the configuration data file.

11. The computer-readable storage medium of claim 9, wherein the target directory includes a path component with a numerical value that indicates the next version for the configuration data file with respect to the latest version of the configuration data file.

12. The computer-readable storage medium of claim 11, wherein the numerical value of the path component in the target directory is a value of the path components in a directory of the latest version of the configuration data file plus one.

13. The computer-readable storage medium of claim 8, further comprising:
   when the directory renaming operation is successful, checking to see if a predefined time period has passed since the reading of the latest version of the configuration data file and, if the predefined time period has passed, retrying the reading, the modifying, the writing and the initiating using another new latest version of the configuration data file and another new target directory by the first host computer; and
   periodically removing versions of the configuration data file that were created prior to the predefined time period.

14. The computer-readable storage medium of claim 13, wherein periodically removing versions of the configuration data file is performed by a second host computer in the storage system that is designated as a master node for a virtual storage area network in the storage system.

15. A system comprising:
   storage; and
   a plurality of host computers, each host computer including memory and at least one processor configured to:

read a latest version of a configuration data file for a distributed file system, the latest version of the configuration data file being accessible by other host computers in the system;

modify the latest version of the configuration data file;

write a modified configuration data file to a temporary file having a temporary file path that identifies a temporary directory;

initiate a directory renaming operation on the temporary file to change the temporary directory to a target directory to write a new updated version of the configuration data file; and when the directory renaming operation has failed due to a successful directory renaming operation for the same target directory by another host computer in the system, perform a retry to write the new updated version of the configuration data file using a new latest version of the configuration data file and a new target directory to write the new updated version of the configuration data file.

16. The system of claim 15, wherein the target directory indicates a next version for the configuration data file with respect to the latest version of the configuration data file.

17. The system of claim 16, wherein the target directory includes a common path component used for all versions of the configuration data file and a child path component that indicates the next version for the configuration data file with respect to the latest version of the configuration data file.

18. The system of claim 16, wherein the target directory includes a path component with a numerical value that indicates the next version for the configuration data file with respect to the latest version of the configuration data file.

19. The system of claim 15, wherein the at least one processor is configured to, when the directory renaming operation is successful, check to see if a predefined time period has lapsed since the reading of the latest version of the configuration data file and, if the predefined time period has passed, perform a retry to write the new updated version of the configuration data file using another new latest version of the configuration data file and another new target directory.

20. The system of claim 19, wherein one of the host computers is designated to periodically remove versions of the configuration data file that were created prior to the predefined time period.

* * * * *